(12) United States Patent
Minks et al.

(10) Patent No.: US 12,450,463 B2
(45) Date of Patent: Oct. 21, 2025

(54) CARD-SHAPED DATA CARRIER WITH A BACK-INJECTED LAYER, AND METHOD FOR PRODUCING A CARD-SHAPED DATA CARRIER

(71) Applicant: GIESECKE+DEVRIENT EPAYMENTS GMBH, Munich (DE)

(72) Inventors: Andreas Minks, Bad Wiessee (DE); Thomas Tarantino, Laufen (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/713,269

(22) PCT Filed: Nov. 29, 2022

(86) PCT No.: PCT/EP2022/025538
§ 371 (c)(1),
(2) Date: May 24, 2024

(87) PCT Pub. No.: WO2023/099031
PCT Pub. Date: Jun. 8, 2023

(65) Prior Publication Data
US 2025/0045554 A1    Feb. 6, 2025

(30) Foreign Application Priority Data
Dec. 2, 2021 (DE) ............. 10 2021 005 960.3

(51) Int. Cl.
*G06K 19/077* (2006.01)
(52) U.S. Cl.
CPC .............. *G06K 19/07722* (2013.01)

(58) Field of Classification Search
CPC ................................ G06K 19/07722
(Continued)

(56) References Cited

U.S. PATENT DOCUMENTS

| 8,390,132 B2 | 3/2013 | Tarantino |
| 11,880,731 B2 | 1/2024 | Riedl |

(Continued)

FOREIGN PATENT DOCUMENTS

| DE | 102008019571 A1 | 10/2009 |
| DE | 102019005934 A1 | 2/2021 |
| EP | 2710864 B1 | 2/2019 |

OTHER PUBLICATIONS

German Search Report from corresponding DE Application No. 102021005960.3, May 24, 2022.
(Continued)

*Primary Examiner* — Allyson N Trail
(74) *Attorney, Agent, or Firm* — Workman Nydegger

(57) ABSTRACT

A card-shaped data carrier includes a card body with at least one arrangement region for receiving a chip module arranged in the arrangement region of the card body. The chip module has at least one chip, a contact structure and at least one antenna. The card body is formed from at least two layers, including a first layer configured as a metal layer with at least one slit extending from a circumferential surface of the metal layer into the region of the arrangement region for the chip module and through the entire thickness of the metal layer; a second layer formed as a back injection molded layer including a back injection molding material. The back injection molded layer is arranged on the metal layer so the slit of the metal layer is at least partially filled with the back injection molding material.

20 Claims, 3 Drawing Sheets

(58) Field of Classification Search
USPC .......................................................... 235/492
See application file for complete search history.

(56) References Cited

U.S. PATENT DOCUMENTS

| | | | |
|---|---|---|---|
| 12,159,180 B1* | 12/2024 | Finn ................... | G06K 19/0723 |
| 2017/0308785 A1* | 10/2017 | Kim .................. | G06K 19/07722 |
| 2018/0339503 A1 | 11/2018 | Finn et al. | |
| 2020/0257953 A1 | 8/2020 | Lotya et al. | |
| 2021/0110231 A1 | 4/2021 | Finn | |
| 2021/0216838 A1* | 7/2021 | Finn ................. | G06K 19/07773 |
| 2022/0237423 A1* | 7/2022 | Lotya ............... | G06K 19/07722 |
| 2023/0234390 A1* | 7/2023 | Lowe ............... | G06K 19/07769 |
| 2024/0362450 A1* | 10/2024 | Kataoka ............... | H01Q 1/2283 |
| 2025/0045554 A1* | 2/2025 | Minks .............. | G06K 19/07722 |

OTHER PUBLICATIONS

International Search Report from corresponding PCT Application No. PCT/EP2022/025538, Mar. 23, 2023.

* cited by examiner

CARD-SHAPED DATA CARRIER WITH A BACK-INJECTED LAYER, AND METHOD FOR PRODUCING A CARD-SHAPED DATA CARRIER

BACKGROUND

The present invention relates to a card-shaped data carrier, in particular a smartcard, and to a method for producing a card-shaped data carrier.

A multiplicity of card-shaped data carriers are known from the prior art, for example smartcards, chip cards, integrated-circuit cards, dual-interface cards, access cards or identification cards. In particular, the use of smartcards, for example credit cards or payment cards, has become established for carrying out financial transactions. Such a card-shaped data carrier has a card body and an integrated circuit embedded into the card body, for example in the form of a chip module with a chip. The chip module is usually arranged, or fitted, in a module opening of the card body.

It is furthermore known, for the production of card-shaped data carriers, to use various components for contact-based and/or contactless data transmission, for example the chip module with a chip and a contact structure for contact-based data transmission, and/or further components, for example an antenna or a capacitor for contactless data transmission.

Chip modules with an integrated or coupled antenna, which allow both contact-based and noncontact or contactless data transmission or communication, are considered below. For example, card-shaped data carriers with an RFID (radiofrequency identification) functionality may thereby be provided.

Card-shaped data carriers with a metallic surface or a metallic core layer are particularly insensitive and are regarded as high-quality. Card-shaped data carriers with an inner-lying or outer-lying metal layer are therefore becoming increasingly widespread.

The functionality of such a card-shaped data carrier consists in using a chip module that itself has a coupled antenna, in particular a coil (coil on module). This coil couples on the card body with a metal layer. However, the metal layer may in this case interfere with or fully prevent the communication, or data transmission. This coupling therefore functions only if undesired ring closures of the magnetic flux can be prevented. In other words, interfering capacitive influences of the metal layer should be prevented.

It is known in this context to provide a slit in order to interrupt ring closures in the metal layer, or to prevent short-circuit currents. However, the slit in the metal layer represents a mechanical instability. In particular, the card-shaped data carrier may break in the region of the slit under external loading. Plastic films applied on the metal layer may also tear in the region of the slit.

SUMMARY

It is therefore an object of the present invention to specify a card-shaped data carrier, in particular a smartcard, in which improved mechanical stabilization of the card-shaped data carrier can be provided. It is furthermore an object of the present invention to specify a method for producing a card-shaped data carrier.

Embodiments and developments of the invention are specified in the dependent claims and are disclosed with reference to the description and the figures. Features and details that are described in connection with the card-shaped data carrier according to the invention also apply here in connection with the method according to the invention, and vice versa in each case, so that in respect of the disclosure reference may always be reciprocally made between the individual aspects of the invention.

In the context of the application, the invention may preferentially be used for smartcards, in particular for credit cards and payment cards. The use for metal cards is preferentially provided here, in particular for fully metal cards, hybrid metal cards with a metallic layer and a plastic layer, as well as for metal cards that are coated or printed on one or both sides with plastic or varnish. Use may, however, also be provided for other RFID devices, for example key cards, access cards, tokens, wearables or security passes.

According to one aspect of the invention, a card-shaped data carrier, in particular a smartcard, is provided, which comprises the following components: a card body with at least one arrangement region for receiving a chip module, the chip module being arranged in the arrangement region of the card body, the chip module comprising at least one chip, a contact structure and at least one antenna. The card body is formed from at least two layers, a first layer being configured as a metal layer with at least one slit, which extends from a circumferential surface of the metal layer into the region of the arrangement region for the chip module and which extends through the entire thickness of the metal layer. A second layer is formed by means of a back injection molding method as a back injection molded layer, which comprises a back injection molding material, the back injection molded layer being arranged on the metal layer in such a way that the slit of the metal layer is at least partially filled with the back injection molding material.

In the context of the application, the metal layer is formed discontinuously, the metal layer having at least one slit. The slit may be regarded here as an electrical and/or mechanical discontinuity. In particular, further possibilities for interrupting ring closures in the metal layer or for preventing short-circuit currents may be provided for the slit. For example, the slit may also be configured as a recess, gap or hole in the metal layer.

Further, in the context of the application, it is provided that the chip module comprises at least one chip, a contact structure and at least one antenna. In particular, the chip is connected by means of wires to contacts of the contact structure. In other words, the chip is coupled with the contact structure. The contacts of the contact structure may be defined in their number, size and position by international standards so that the function of the smartcard can be ensured in any reader. Advantageously, contact-based data transmission between the smartcard and a reader may be established by means of the chip module and in particular the contact structure.

The chip module furthermore comprises an antenna (as a coil) for inductive contactless data transmission. The antenna is in particular coupled with the chip, or the chip is connected to the antenna. A contactless smartcard can communicate with a reader by electromagnetic waves, wherein the smartcard may function in a similar way to a transmission and reception device. In particular, electromagnetic waves emitted by the reader generate an oscillating electromagnetic field which, for example, generates an oscillating electrical voltage in the coil or antenna of the chip module, whereby the chip can be supplied with power. The oscillations of the voltage may be detected here as a signal and converted into data in the chip. These data may in turn be processed in the chip and converted into variations of the electromagnetic field, which may in turn be detected by the reader and converted into data. Overall, the chip, the contact structure and the antenna may therefore allow contact-based and/or contactless data transmission.

The invention has the advantage that the back injection molded layer may form a type of protective layer for the metal layer and may therefore ensure mechanical stabilization of the metal layer. Because of the back injection molding of the metal layer, no further intermediate layers, for example adhesive layers, are preferentially required and the metal layer can form a stable composite with the back injection molded layer. In particular, this may also facilitate the production of the card-shaped data carrier since adhesive bonding processes or laminating processes can be obviated.

In the context of the application, it may, however, optionally also be provided that at least one, in particular functional, layer, or alternatively any desired number of further intermediate layers may be provided between the metal layer and the back injection molded layer. In other words, the arrangement of the back injection molded layer on the metal layer may take place here via the intermediate layer(s). In particular, the back injection molded layer may in this case be arranged on the metal layer via the intermediate layer(s) in such a way that the slit of the metal layer is at least partially filled with the back injection molding material. A person skilled in the art will in this case understand that any intermediate layers have corresponding passages, for example in the form of holes or corresponding slits, so that the back injection molding material can flow through the intermediate layers into the slit of the metal layer for mechanical stabilization.

In addition, the back injection molding of the metal layer may achieve the advantage that back injection molding material flows at least partially, in particular fully, into the slit of the metal layer and the slit of the metal layer is therefore filled at least partially, in particular fully, with the back injection molding material. This additionally ensures mechanical stabilization of the slit of the metal layer. Overall, by means of the back injection molded layer according to the invention, on the one hand full mechanical stabilization of the metal layer and on the other hand also additional mechanical stabilization of the slit of the metal layer may be achieved.

Preferably, it can be provided that the back injection molded layer extends at least partially, in particular fully, along the metal layer. This has the advantage that the back injection molded layer may be configured as a protective layer for the metal layer. Particularly in the event that the back injection molded layer extends fully along the metal layer, full mechanical stabilization may be achieved. For example, the back injection molded layer may be configured to be transparent. Preferably, a plastic material may be provided for the back injection molding material of the back injection molded layer. If the card body is formed from a total of two layers, the thickness of the back injection molded layer and the metal layer may for example be a standardized card thickness of 840 µm. Alternatively, even more layers may be provided for the card body, for example a further layer of plastic or wood, and the back injection molded layer and/or the metal layer may correspondingly be made thinner.

Preferentially, it can be provided that the arrangement region for receiving the chip module is formed by a recess in the card body, particularly in the metal layer, in which the chip module is received. The chip module may be arranged, or fitted, in the recess, for example a cavity or module opening, of the card body, or of the metal layer. This has the advantage of a protected and space-saving arrangement of the chip module inside the card body of the card-shaped data carrier. For example, it can be provided that the recess is formed in the metal layer as a continuous module opening, the slit of the metal layer extending from the circumferential surface of the metal layer into the region of the recess and through the entire thickness of the metal layer. Preferentially, the chip and the contact structure of the chip module may in this case be arranged inside the recess. It is also conceivable for the antenna of the chip module to be arranged in the arrangement region or to be arranged in a functional layer. Relocating the antenna from the arrangement region makes it possible to use a larger antenna for an improved RFID functionality.

Alternatively or in addition, it can be provided that the back injection molded layer has a molded cavity for receiving electronics of the chip module, the cavity being in particular arranged below the arrangement region for receiving the chip module. For example, a cavity may be arranged in the back injection molded layer below the recess or the module opening for the chip module in the metal layer. Electronic components of the chip module may preferentially be received and kept protected in the cavity. The molding of the cavity may preferentially take place while applying the back injection molding method. The cavity may therefore be molded straightforwardly during the back injection molding and additional milling processes for forming the cavity may be obviated. Overall, the production of the card-shaped data carrier may therefore be further simplified.

In one particularly preferred embodiment, it can be provided that the metal layer has at least one cutout, the cutout of the metal layer being at least partially filled with the back injection molding material. In general, a plurality of cutouts may be provided in the metal layer. The cutouts may, for example, be configured as continuous holes in the metal layer. This has the advantage that the cutout or the cutouts of the metal layer are at least partially filled with the back injection molding material when the back injection molded layer is arranged on the metal layer by means of the back injection molding method. In particular, improved anchoring of the back injection molding material to the metal layer may thereby be achieved. Furthermore, the mechanical stabilization can be generally improved by the cutouts.

Preferentially, it can be provided that the cutout is arranged in the region of the slit. This has the advantage that an additional improvement of the mechanical stability may be achieved, particularly in the region of the slit by means of the cutout. For example, it can be provided that a plurality of cutouts are arranged along the slit. Preferentially, two cutouts may respectively be arranged on the right side and left side of the slit.

Preferably, it can be provided that the cutout is configured circularly or that a plurality of cutouts are provided so that an optical logo can be represented. In general, the cutout or the plurality of cutouts may have any geometrical shape. For example, the geometrical shape of the cutout or the cutouts may be adapted flexibly to the optical configuration of the card-shaped data carrier. As an example, a logo of a bank or a customer-specific design may be represented by means of the cutouts.

Advantageously, it can be provided that the metal layer forms an outer-lying layer of the card-shaped data carrier or that a third outer-lying layer is provided, which covers the metal layer. If the outer-lying layer of the card-shaped data carrier is formed by the metal layer, the card-shaped data carrier may for example be configured as a metal-face card. Alternatively, a third outer-lying, in particular transparently configured, layer may cover the metal layer. The third layer may for example be formed from plastic or alternatively also from wood. If there is a third layer, the card-shaped data carrier may for example be configured as a metal-core card with an inner-lying metal layer. In general, depending on the application, any desired number of layers may be provided for the card body, for example a printed layer with visible features or an overlay layer. Security features in the visible, IR and/or UV range as well as configuration features may for example be arranged in such layers. Customer-specific information may also be provided.

Particularly preferentially, it can be provided that the third outer-lying layer is formed by means of a back injection molding method as a second back injection molded layer, which comprises a back injection molding material, the second back injection molded layer being arranged on the metal layer in such a way that the slit of the metal layer is at least partially filled with the back injection molding material. In other words, a second back injection molded layer may be provided in addition to the back injection molded layer, the second back injection molded layer being formed particularly in a similar way to the back injection molded layer. The back injection molded layers are in this case preferentially arranged on both sides of the metal layer, in order to form a metal-core card with an inner-lying metal layer. For example, the same back injection molding material may be used for the back injection molded layer and the second back injection molded layer. Alternatively, different back injection molding materials may be used, depending on the application. The use of a second back injection molded layer has, in particular, the advantage that the slit of the metal layer may be partially filled from both sides by the respective back injection molding material, so that substantially full filling of the slit may be ensured. This advantageously allows full mechanical stabilization of the slit.

Particularly preferentially, it can be provided that an adhesive layer is arranged between the third outer-lying layer and the metal layer. The adhesive layer has the advantage of improved bonding between the individual layers, for which reason the metal layer may be permanently connected to the third outer-lying layer.

Alternatively or in addition, it can be provided that a functional layer on which at least one component of the chip module is arranged, in particular the antenna of the chip module, is arranged between the metal layer and the back injection molded layer, the functional layer having a slit which corresponds to the slit of the metal layer and extends from a circumferential surface of the functional layer into the region of the arrangement region for the chip module and which extends through the entire thickness of the functional layer. In other words, the slit of the functional layer may extend below and along the slit of the metal layer. In particular, the slit of the functional layer is formed in a similar way to the slit of the metal layer. This ensures that the back injection molding material flows through the slit of the functional layer into the slit of the metal layer during the back injection molding method and can at least partially fill the slit of the metal layer. For example, the functional layer may be connected to the metal layer before the back injection molding method in a separate method step, in particular by means of an adhesive layer. The functional layer may optionally comprise further electronic components or else a ferrite layer. For example, arranging the antenna on the functional layer makes it possible to provide an enlarged antenna for improving the RFID functionality. Following the connection of the functional layer to the metal layer, the back injection molded layer is arranged on the functional layer as an intermediate layer by means of the back injection molding method, the back injection molding material being able to flow through the slit of the functional layer into the slit of the metal layer and being able to fill the latter.

According to a second aspect of the invention, a method for producing a card-shaped data carrier, in particular a smartcard, according to one of the embodiments above is provided, the method comprising the following steps:

providing the first layer as a metal layer with a slit,
arranging the chip module in the arrangement region;
back injection molding the metal layer in order to form the second layer as a back injection molded layer, the back injection molded layer being arranged on the metal layer in such a way that the slit of the metal layer is at least partially filled with the back injection molding material.

Preferentially, further steps may be provided for the method for producing the card-shaped data carrier. For example, the chip module may be arranged in a recess in the card body, particularly in the metal layer. Furthermore, a cavity for receiving electronics of the chip module may be molded in the back injection molded layer. Further, at least one cutout may be arranged in the metal layer, the cutout being at least partially filled with the back injection molding material during the back injection molding method. The cutout may, for example, be arranged in the region of the slit of the metal layer. Further, a third outer-lying layer may be arranged on the metal layer. This third outer-lying layer may, for example, be formed in a similar way to the back injection molded layer by means of a back injection molding method as a second back injection molded layer, the slit of the metal layer being at least partially filled with the back injection molding material. Alternatively, an adhesive layer may be arranged between the third outer-lying layer and the metal layer. Preferentially, a functional layer on which at least one component of the chip module is arranged, in particular the antenna of the chip module, may be arranged between the metal layer and the back injection molded layer.

Overall, the method according to the invention therefore has the same advantages as have been explained with reference to the card-shaped data carrier according to the invention.

BRIEF DESCRIPTION OF THE DRAWINGS

The present invention will be described below with reference to the appended figures by way of example in the context of embodiments. Individual features of the embodiments may of course be freely combined with one another, insofar as technically expedient, without departing from the scope of the present invention. Elements with the same function and effect are provided with the same reference signs in the figures. In the figures below, schematically.

DETAILED DESCRIPTION OF THE DRAWINGS

Figure 1:
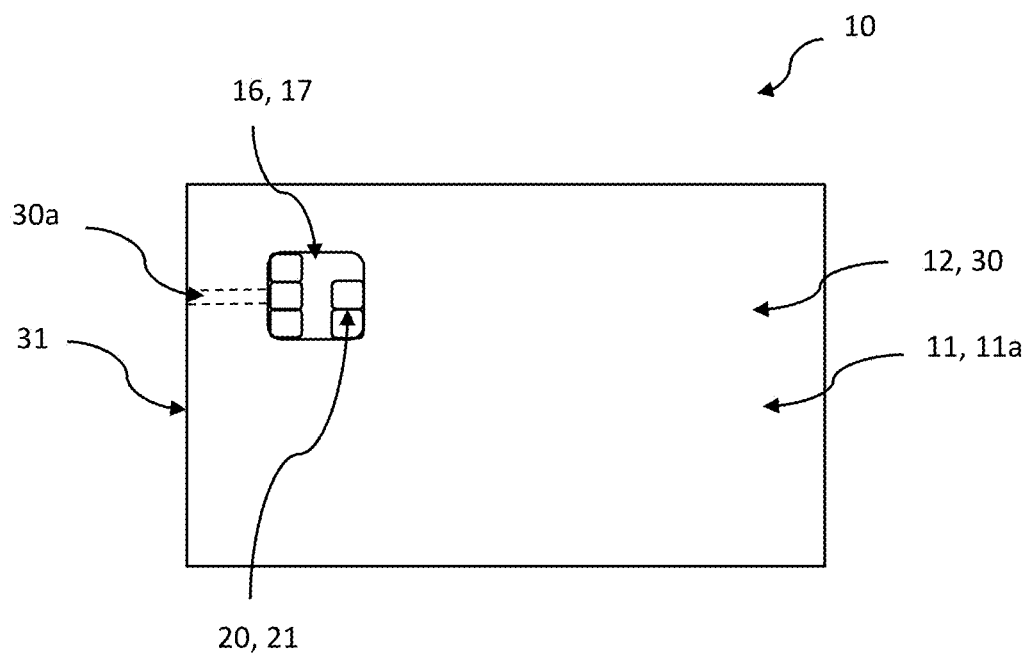
FIG. 1 shows a plan view of a card-shaped data carrier according to one exemplary embodiment according to the invention.

FIG. 1 shows a plan view of a card-shaped data carrier 10 according to one exemplary embodiment according to the invention. The card-shaped data carrier 10 is configured for example as a smartcard, in particular as a credit card, and comprises the following components.

The card-shaped data carrier 10 has a rectangular card body 11 with a surface 11a. In particular, the card body 11 of the card-shaped data carrier 10 has a layer structure (not represented). In other words, the card body 11 is formed from a plurality of individual layers, which are arranged stacked on one another. A first layer 12 and a second layer 13 (not represented) are in this case provided for the card body 11. In particular, the surface 11a of the card body 11 is formed as the surface of the first layer 12. For example, the first layer 12 may be configured as a metal layer 30. The second layer 13 (not represented) may be configured as a back injection molded layer 40. Further details in this regard are described with reference to FIG. 2.

An electronic chip module 20 with at least one chip (not represented) and a contact structure 21 is further provided. In particular, the contact structure 21 is coupled with the chip. Contact-based data transmission can therefore be established between the smartcard and a reader. The chip module 20 furthermore comprises an antenna (as a coil) (not represented) for inductive contactless data transmission. For example, the antenna may be embedded into the second layer 13 as a back injection molded layer 40, the antenna being coupled with the chip of the chip module 20. Overall, the chip module 20 may therefore allow contact-based and/or contactless data transmission.

The card body 11 of the card-shaped data carrier 10 has an arrangement region 16 for receiving the chip module 20, the chip module 20 being arranged in the arrangement region 16 of the card body 11. Particularly preferentially, it is provided that the chip and the contact structure 21 of the chip module 20 is arranged in the arrangement region 16 of the card body 11. It can also be provided that the antenna of the chip module 20 is arranged in the arrangement region 16 or in a functional layer. For example, the arrangement region 16 is formed by a recess 17 in the card body 11, in which the chip module 20 is received and therefore kept protected. In particular, it is provided that the arrangement region 16 is formed by a recess 17 in the first layer 12 as a metal layer 30. In other words, the chip module 20 is arranged on the surface 11a of the card body 11 in the first layer 12 inside the recess 17. Expressed another way, the recess 17 in the first layer 12 constitutes a module opening for the chip module 20.

The metal layer 30 of the first layer 12 has a slit 30a, which extends from a circumferential surface 31 of the metal layer 30 into the region of the arrangement region 16 for the chip module 20 and which extends through the entire thickness of the metal layer 30. The slit 30a ensures an interruption of detrimental ring closures in the metal layer 30 or the prevention of short-circuit currents. The slit 30a can ensure the RFID functionality of the smartcard.

The second layer 13 (not represented) is formed by means of a back injection molding method as a back injection molded layer 40, which comprises a back injection molding material 41, the back injection molded layer 40 being arranged on the metal layer 30 in such a way that the slit 30a of the metal layer 30 is at least partially filled with the back injection molding material 41. In particular, the back injection molded layer 40 extends fully along the metal layer 30. The back injection molded layer 40 advantageously forms a type of protective layer for the metal layer 30 and therefore ensures mechanical stabilization of the metal layer 30. In addition, the back injection molding of the metal layer 30 may achieve the advantage that the back injection molding material 41 flows at least partially, in particular fully, into the slit 30a of the metal layer 30 and the slit 30a of the metal layer 30 is therefore filled at least partially, in particular fully, with the back injection molding material 41. This is represented by way of example with reference to FIG. 2. Mechanical stabilization of the slit 30a of the metal layer 30 may consequently be achieved.

Furthermore, the back injection molded layer 40 may have a molded cavity 18 (not represented) for receiving electronics of the chip module 20, the cavity 18 being in particular arranged below the arrangement region 16 for receiving the chip module 20.

For example, the metal layer 30 forms an outer-lying layer of the card-shaped data carrier 10. The card-shaped data carrier 10 is therefore configured as a metal-face card.

Figure 2:
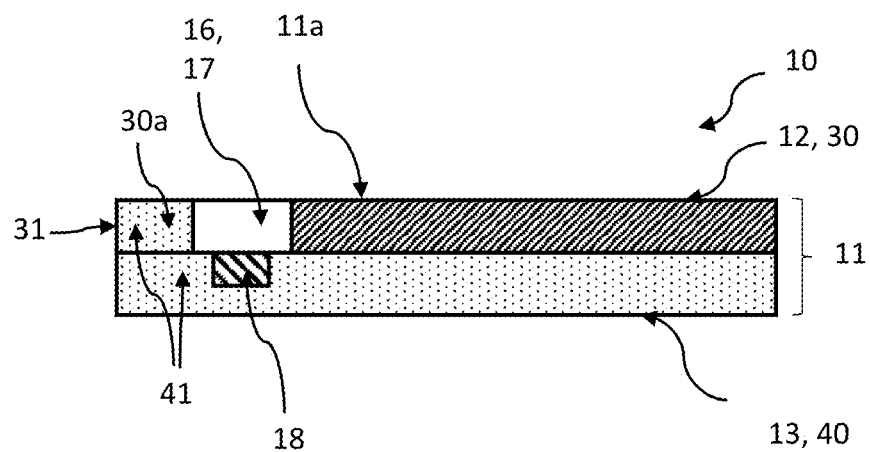
FIG. 2 shows a cross-sectional view of the card-shaped data carrier according to FIG. 1.

FIG. 2 shows a cross-sectional view of the card-shaped data carrier 10 according to FIG. 1. The card-shaped data carrier 10 is constructed in a similar way to FIG. 1. In particular, FIG. 2 shows the layer structure of the card body 11 with the first layer 12 as a metal layer 30 and the underlying second layer 13 as a back injection molded layer 40. It may furthermore be seen that the slit 30a of the metal layer 30 is fully filled by the back injection molding material 41 of the back injection molded layer 40 and is therefore mechanically stabilized.

FIG. 2 further shows the cavity 18 that is molded in the back injection molded layer 40. For example, the cavity 18 is arranged in the back injection molded layer 40 below the recess 17 or the module opening for the chip module 20 in the metal layer 30. Electronic components of the chip module 20 may preferentially be received and kept protected in the cavity 18. The molding of the cavity 18 may preferentially take place while applying the back injection molding method in order to form the back injection molded layer 40.

Figure 3:
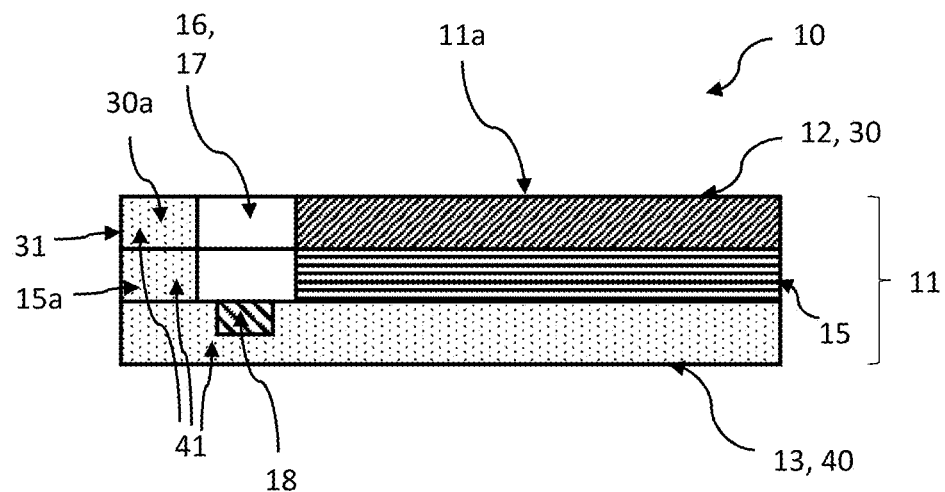
FIG. 3 shows a cross-sectional view of a card-shaped data carrier according to a further exemplary embodiment according to the invention.

FIG. 3 shows a cross-sectional view of a card-shaped data carrier 10 according to a further exemplary embodiment according to the invention. The card-shaped data carrier 10 is essentially constructed in a similar way to FIG. 2. In contrast to FIG. 2, a functional layer 15 is arranged between the metal layer 30 and the back injection molded layer 40. The card body 11 therefore has three layers, namely the first layer 12 as a metal layer 30, the functional layer 15 and the second layer 13 as a back injection molded layer 40. The functional layer 15 extends here fully along the metal layer 30, or the back injection molded layer 40. The antenna (not represented) of the chip module 20 is arranged on the functional layer 15. In particular, the antenna (not represented) is embedded or milled into the functional layer 15. Relocating the antenna from the arrangement region 16 consequently makes it possible to use a larger antenna in order to improve the RFID functionality.

The functional layer 15 has a slit 15a which corresponds to the slit 30a of the metal layer 30 and extends from the circumferential surface of the functional layer 15 into the region of the arrangement region 16 for the chip module 20, and which extends through the entire thickness of the functional layer 15. In other words, the slit 15a of the functional layer 15 may extend below and along the slit 30a of the metal layer 30. In particular, the slit 15a of the functional layer 15 is formed in a similar way to the slit 30a of the metal layer 30. This ensures that the back injection molding material 41 flows through the slit 15a of the functional layer 15 into the slit 30a of the metal layer 30 during the back injection molding method and can at least partially fill the slit 30a of the metal layer 30. It may be seen in FIG. 3 that both the slit 15a of the functional layer 15 and the slit 30a of the metal layer 30 are filled with the back injection molding material 41.

For example, the functional layer 15 may be connected to the metal layer 30 before the back injection molding method in a separate method step, in particular by means of an adhesive layer. Following the connection of the functional layer 15 to the metal layer 30, the back injection molded layer 40 is arranged on the functional layer 15 as an intermediate layer, and therefore also on the metal layer 30, by means of the back injection molding method, the back injection molding material 41 being able to flow through the slit 15a of the functional layer 15 into the slit 30a of the metal layer 30.

As may be seen in FIG. 3, the arrangement region 16 for receiving the chip module 20 is formed by a recess 17, which extends through the metal layer 30 and the underlying functional layer 15. In other words, the recess 17 forms a module opening within the metal layer 30 and the functional layer 15.

FIG. 3 further shows the cavity 18 that is molded in the back injection molded layer 40. For example, the cavity 18 is arranged in the back injection molded layer 40 below the recess 17 or the module opening for the chip module 20 in the metal layer 30 and the functional layer 15. Electronic components of the chip module 20 may preferentially be received and kept protected in the cavity 18.

Figure 4:
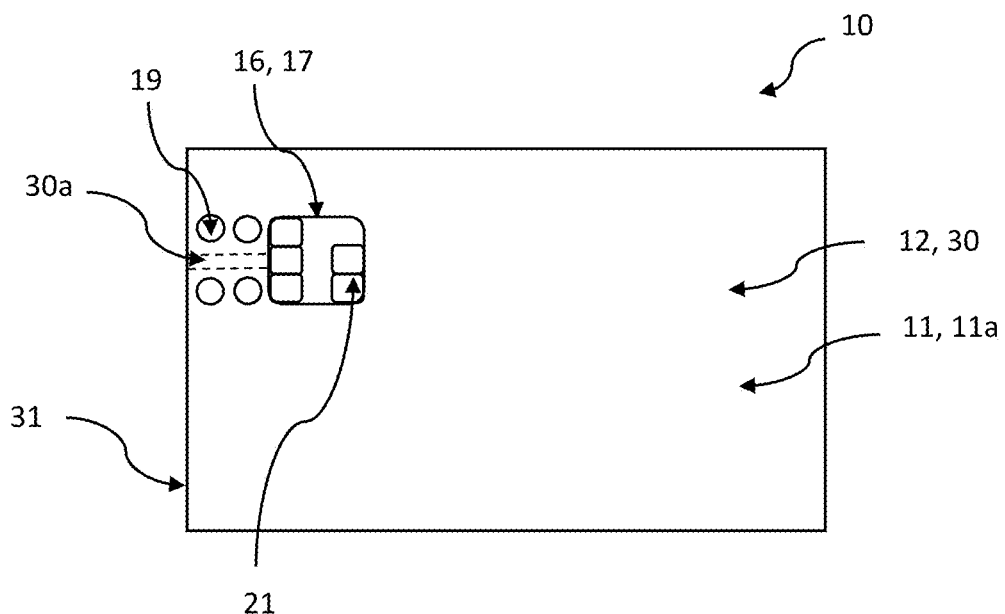
FIG. 4 shows a plan view of a card-shaped data carrier according to a third exemplary embodiment according to the invention.

FIG. 4 shows a plan view of a card-shaped data carrier 10 according to a third exemplary embodiment according to the invention. The card-shaped data carrier 10 may be configured for example according to FIG. 2 or according to FIG. 3.

In contrast to FIG. 2 or FIG. 3, the metal layer 30 of the card-shaped data carrier 10 according to FIG. 4 has four cutouts 19, which are at least partially filled with the back injection molding material 41. The cutouts 19 are arranged in the region of the slit 30a, and are for example configured circularly. For example, two cutouts 19 are respectively arranged on the right side and left side of the slit 30a.

The cutouts 19 may, for example, be configured as continuous holes in the metal layer 30. This has the advantage, particularly in relation to FIG. 2, that when the back injection molded layer 40 is arranged on the metal layer 30 by means of the back injection molding method, the cutouts 19 of the metal layer 30 are at least partially filled with the back injection molding material 41. In particular, improved anchoring of the back injection molding material 41 to the metal layer 30 may thereby be achieved. If a functional layer 15 is provided as an intermediate layer according to FIG. 3, the functional layer 15 has similar cutouts 19 so that the back injection molding material 41 can flow through the cutouts of the functional layer 15 into the cutouts 19 of the metal layer 30 and can at least partially fill the cutouts of the metal layer 30.

Figure 5:
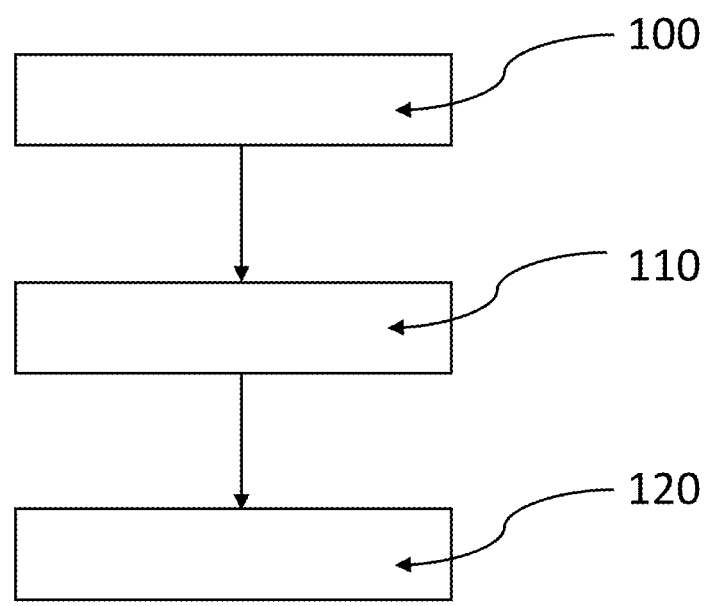
FIG. 5 shows a schematic view of a method for producing a card-shaped data carrier according to one exemplary embodiment according to the invention.

FIG. 5 shows a schematic view of a method for producing a card-shaped data carrier according to one exemplary embodiment according to the invention. In particular, the card-shaped data carrier according to FIGS. 1 to 4 may be produced. The method comprises for example the following steps, and may optionally also have further method steps.

In a first step 100, the first layer 12 as a metal layer 30 is provided with the slit 30a. In a second step 110, the chip module 20 is arranged in the arrangement region 16. For example, a functional layer 15 may be arranged on the metal layer 30 in an additional intermediate step. In a third step 120, the metal layer 30 (or optionally the functional layer as an intermediate layer) is back-injection-molded in order to form the second layer 13 as a back injection molded layer 40, the back injection molded layer 40 being arranged on the metal layer 30 in such a way that the slit 30a of the metal layer 30 is at least partially filled with the back injection molding material 41.

The invention claimed is:

1. A card-shaped data carrier, comprising a card body with at least one arrangement region for receiving a chip module,
wherein the chip module is arranged in the arrangement region of the card body,
wherein the chip module comprises at least one chip, a contact structure and at least one antenna,
wherein the card body is formed from at least two layers,
wherein a first layer is configured as a metal layer with at least one slit, which extends from a circumferential surface of the metal layer into the region of the arrangement region for the chip module and which extends through the entire thickness of the metal layer,
wherein a second layer is formed by means of a back injection molding method as a back injection molded layer, which comprises a back injection molding material,
wherein the back injection molded layer is arranged on the metal layer in such a way that the slit of the metal layer is at least partially filled with the back injection molding material.

2. The card-shaped data carrier according to claim 1, wherein the back injection molded layer extends at least partially along the metal layer.

3. The card-shaped data carrier according to claim 1, wherein the arrangement region for receiving the chip module is formed by a recess in the card body, in which the chip module is received.

4. The card-shaped data carrier according to claim 1, wherein the back injection molded layer has a molded cavity for receiving electronics of the chip module, the cavity being arranged below the arrangement region for receiving the chip module.

5. The card-shaped data carrier according to claim 1, wherein the metal layer has at least one cutout, the at least one cutout of the metal layer being at least partially filled with the back injection molding material.

6. The card-shaped data carrier according to claim 5, wherein the cutout is arranged in the region of the slit.

7. The card-shaped data carrier according to claim 5, wherein the cutout is configured circularly, or in that a plurality of cutouts are provided so that an optical logo can be represented.

8. The card-shaped data carrier according to claim 1, wherein the metal layer forms an outer-lying layer of the card-shaped data carrier, or in that a third outer-lying layer is provided, which covers the metal layer.

9. The card-shaped data carrier according to claim 8, wherein the third outer-lying layer is formed by means of a back injection molding method as a second back injection molded layer, which comprises a back injection molding material, the second back injection molded layer being arranged on the metal layer in such a way that the slit of the metal layer is at least partially filled with the back injection molding material.

10. The card-shaped data carrier according to claim 8, wherein an adhesive layer is arranged between the third outer-lying layer and the metal layer.

11. A method for producing a card-shaped data carrier according to claim 1,
wherein the method comprises the following steps:
providing the first layer as a metal layer with a slit,
arranging the chip module in the arrangement region;
back injection molding the metal layer in order to form the second layer as a back injection molded layer, the back injection molded layer being arranged on the metal layer in such a way that the slit of the metal layer is at least partially filled with the back injection molding material.

12. The card-shaped data carrier according to claim 1, wherein no adhesive is provided between the first layer and the second layer.

13. The card-shaped data carrier according to claim 1, wherein no adhesive is provided on the first layer between the first layer and the second layer.

14. The card-shaped data carrier according to claim 1, wherein the back injection molding material includes a plastic material.

15. The card-shaped data carrier according to claim 1, wherein the card body is formed from a total of two layers.

16. The card-shaped data carrier according to claim 1, wherein the metal layer has a plurality of cutouts, and wherein the plurality of cutouts are at least partially filled with the back injection molding material.

17. The card-shaped data carrier according to claim 1, wherein the metal layer has a plurality of cutouts arranged along the slit, and wherein the plurality of cutouts are at least partially filled with the back injection molding material.

18. The card-shaped data carrier according to claim 1, wherein metal layer is arranged as an outer layer of the card body such that the card-shaped data carrier is a metal-faced card.

19. A card-shaped data carrier, comprising a card body with at least one arrangement region for receiving a chip module,
wherein the chip module is arranged in the arrangement region of the card body,
wherein the chip module comprises at least one chip, a contact structure and at least one antenna,
wherein the card body is formed from at least two layers,
wherein a first layer is configured as a metal layer with at least one slit, which extends from a circumferential surface of the metal layer into the region of the arrangement region for the chip module and which extends through the entire thickness of the metal layer,
wherein a second layer is formed by means of a back injection molding method as a back injection molded layer, which comprises a back injection molding material,
wherein the back injection molded layer is arranged on the metal layer in such a way that the slit of the metal layer is at least partially filled with the back injection molding material, and
wherein a functional layer on which at least one component of the chip module is arranged, is arranged between the metal layer and the back injection molded layer, the functional layer having a slit which corresponds to the slit of the metal layer and extends from a circumferential surface of the functional layer into the region of the arrangement region for the chip module, and which extends through the entire thickness of the functional layer.

20. A method for producing a card-shaped data carrier that includes a card body with at least one arrangement region for receiving a chip module, the method comprises the following steps:
providing a first layer of the card body, the first layer including a metal layer with at least one slit, wherein the slit extends from a circumferential surface of the metal layer into a region of the arrangement region for the chip module and which extends through the entire thickness of the metal layer;
arranging a chip module in the arrangement region; and
back injection molding the metal layer thereby forming a second layer of the card body as a back injection molded layer, the back injection molded layer being arranged on the metal layer in such a way that the slit of the metal layer is at least partially filled with the back injection molding material.

* * * * *